United States Patent
Yuyama et al.

(10) Patent No.: US 10,762,614 B2
(45) Date of Patent: Sep. 1, 2020

(54) INSPECTION APPARATUS, INSPECTION METHOD AND COMPUTER PROGRAM PRODUCT

(71) Applicant: YUYAMA MFG. CO., LTD., Toyonaka-shi, Osaka (JP)

(72) Inventors: Hiroyuki Yuyama, Toyonaka (JP); Hirokazu Amano, Toyonaka (JP)

(73) Assignee: YUYAMA MFG, CO., LTD., Toyonaka-Shi, Osaka (JP)

( * ) Notice: Subject to any disclaimer, the term of this patent is extended or adjusted under 35 U.S.C. 154(b) by 119 days.

(21) Appl. No.: 15/766,317

(22) PCT Filed: Aug. 23, 2016

(86) PCT No.: PCT/JP2016/074553
§ 371 (c)(1),
(2) Date: Apr. 5, 2018

(87) PCT Pub. No.: WO2017/068851
PCT Pub. Date: Apr. 27, 2017

(65) Prior Publication Data
US 2018/0286031 A1   Oct. 4, 2018

(30) Foreign Application Priority Data

Oct. 19, 2015   (JP) ................. 2015-205800

(51) Int. Cl.
*G06K 9/00* (2006.01)
*G06T 7/00* (2017.01)
*G06K 9/18* (2006.01)

(52) U.S. Cl.
CPC ........ *G06T 7/0002* (2013.01); *G06K 9/00671* (2013.01); *G06K 9/00771* (2013.01);
(Continued)

(58) Field of Classification Search
CPC ................................... G06K 2209/27
See application file for complete search history.

(56) References Cited

U.S. PATENT DOCUMENTS 6,574,580 B2   6/2003   Hamilton
6,610,973 B1   8/2003   Davis, III
(Continued)

FOREIGN PATENT DOCUMENTS

| JP | H05-337168 A | 12/1993 |
|----|--------------|---------|
| JP | 2011-104188 A | 6/2011 |
| WO | 2015/029020 A1 | 3/2015 |

OTHER PUBLICATIONS

ISA/JPO, International Search Report dated Dec. 20, 2016 in International Application No. PCT/JP2016/074553, total 2 pages with English translation.

*Primary Examiner* — Oneal R Mistry
(74) *Attorney, Agent, or Firm* — Masuvalley & Partners

(57) ABSTRACT

Provided is an inspection apparatus, an inspection method and a computer program product which can easily remove an improper target object. An inspection apparatus (1000) includes a base (700) for placing target objects thereon, a photographing part (100) which can photograph the target objects placed on the base (700), an inspection part for performing an inspection for the target objects placed on the base (700) based on an image photographed by the photographing part (100), and a distinguishing process part for performing a process of making a specific target object placed on the base (700) visually distinguishable from other target objects placed on the base (700) based on a result of the inspection performed by the inspection part.

11 Claims, 14 Drawing Sheets

(52) U.S. Cl.
CPC .............. *G06K 9/18* (2013.01); *G06T 7/0004* (2013.01); *G06K 2209/27* (2013.01); *G06T 2207/30108* (2013.01)

(56) References Cited

U.S. PATENT DOCUMENTS

| | | | |
|---|---|---|---|
| 6,738,723 | B2 | 5/2004 | Hamilton |
| 7,599,516 | B2 | 10/2009 | Limer et al. |
| 8,215,557 | B1 | 7/2012 | Reno et al. |
| 2012/0293623 | A1* | 11/2012 | Nygaard ............... G06T 7/0004 348/46 |
| 2013/0141566 | A1* | 6/2013 | Lang ..................... A61J 7/02 348/135 |
| 2013/0170732 | A1* | 7/2013 | Gotou ................... G06T 7/0012 382/141 |
| 2016/0275363 | A1* | 9/2016 | Matsuzaki ........... G07G 1/0063 |
| 2018/0170591 | A1* | 6/2018 | Koike .................... B65B 9/067 |

\* cited by examiner

INSPECTION APPARATUS, INSPECTION METHOD AND COMPUTER PROGRAM PRODUCT

RELATED APPLICATIONS

This application is a national phase application under 35 U.S.C. § 371 of International Patent Application No. PCT/JP2016/074553, filed on Aug. 23, 2016, which claims priority under 35 U.S.C. § 119 to Japanese Patent Application No. 2015-205800, filed on Oct. 19, 2015, which are hereby expressly incorporated by reference in their entirety for all purposes.

TECHNICAL FIELD

The present invention relates to an inspection apparatus, an inspection method and a computer program product.

BACKGROUND ART

In recent years, many inspection apparatuses for counting or inspecting target objects such as tablets have been proposed as described in the following patent documents. Although inspection methods used in the inspection apparatuses are various, an inspection apparatus in one example photographs target objects placed on an inspection base and inspects the target objects based on a photographed image.

SUMMARY OF THE INVENTION

In a conventional inspection apparatus, it is not considered to easily remove an improper target object in a case of determining that the improper target object is mixed as a result of an inspection for target objects.

Thus, the present invention is intended to provide an inspection apparatus, an inspection method and a computer program product which can easily remove the improper target object.

According to a first aspect of the present invention, there is provided an inspection apparatus comprising a base for placing target objects thereon, a photographing part which can photograph the target objects placed on the base, an inspection part for performing an inspection for the target objects placed on the base based on an image photographed by the photographing part and a distinguishing process part for performing a process of making a specific target object placed on the base visually distinguishable from other target objects placed on the base based on a result of the inspection performed by the inspection part.

According to a second aspect of the present invention, there is provided an inspection method comprising a photographing step for photographing target objects placed on a base, an inspection step for inspecting the target objects placed on the base based on an image photographed by the photographing step and a distinguishing process step for making a specific target object placed on the base visually distinguishable from other target objects based on a result of the inspection step.

According to a third aspect of the present invention, there is provided a computer program product enabling a computer to perform a receiving step for receiving a result of an inspection for target objects based on an image obtained by photographing the target objects placed on a base and a distinguishing process step for performing a process of making a specific target object placed on the base visually distinguishable from other target objects based on the result of the inspection received by the receiving step.

According to the present invention, it is possible to provide an inspection apparatus, an inspection method and a computer program product which can easily remove an improper target object.

DETAILED DESCRIPTION OF THE INVENTION

Hereinafter, detailed description will be given to an embodiment of the present invention with reference to the accompanying drawings. In this regard, in each drawing, the same reference sign is attached to constitutional components providing the same or similar function and overlapping description will be omitted.

Figure 1:
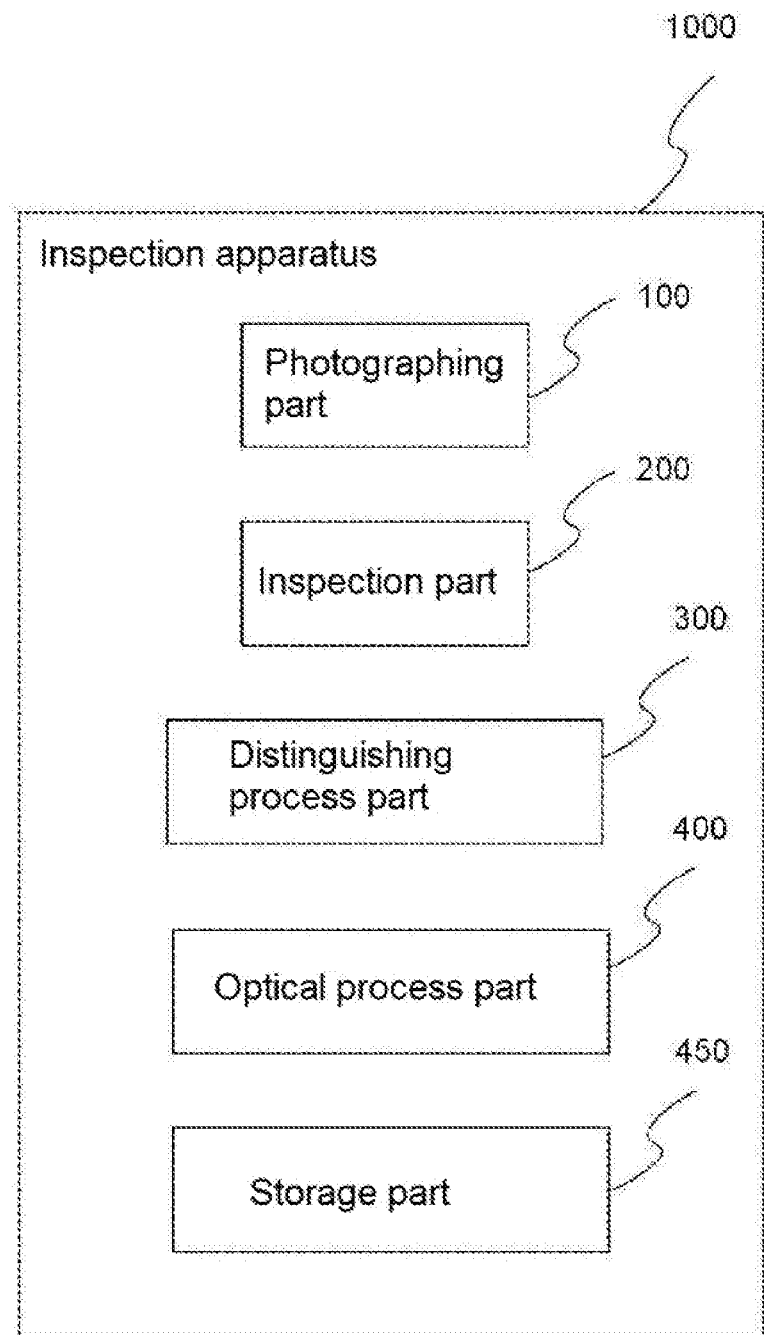
FIG. 1 is a block diagram showing a functional block of an inspection apparatus according to one embodiment of the present invention.
Figure 2:
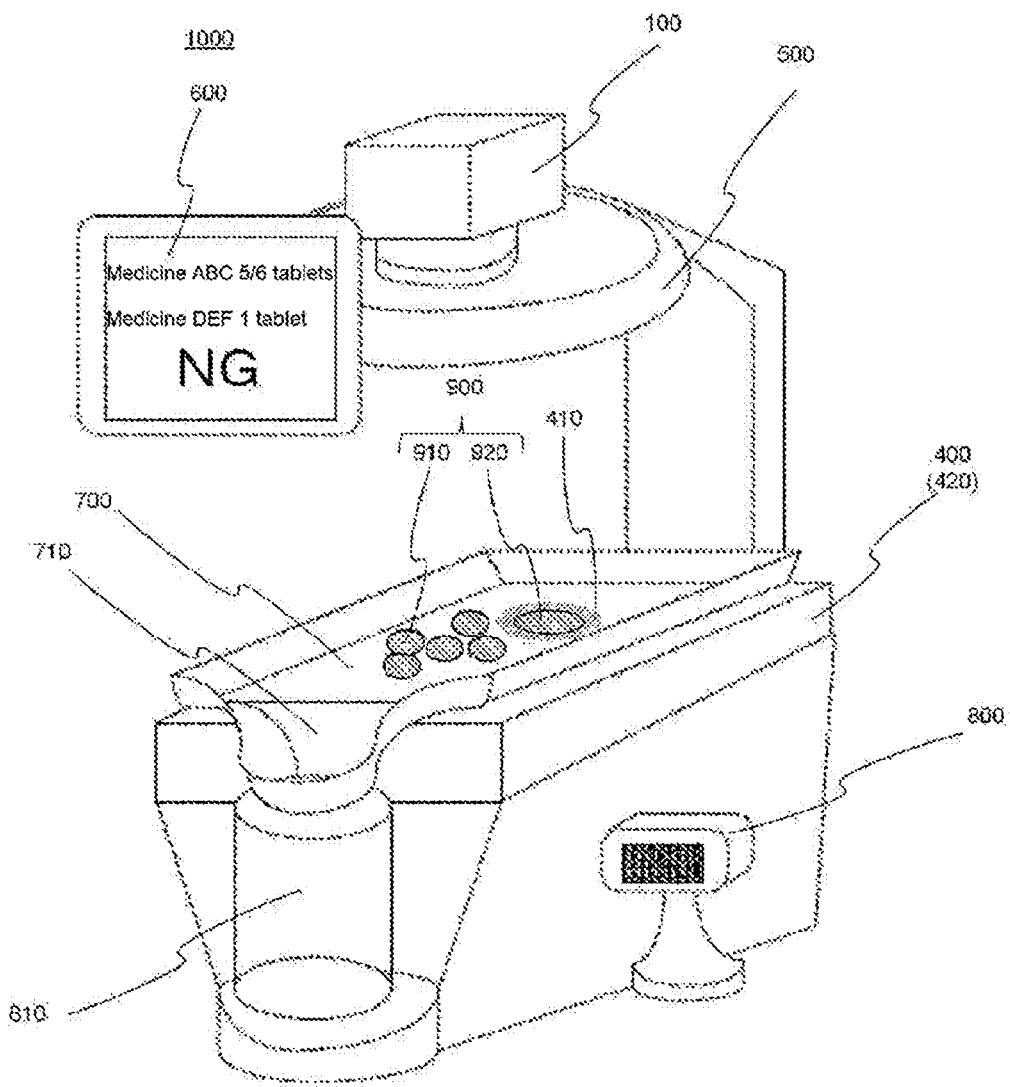
FIG. 2 is a view showing an entire configuration of the inspection apparatus according to the one embodiment of the present invention.

FIG. 1 is a block diagram showing a functional block of an inspection apparatus according to one embodiment of the present invention. FIG. 2 is a view showing an entire configuration of the inspection apparatus according to the one embodiment of the present invention. As shown in FIGS. 1, 2, an inspection apparatus 1000 includes a photographing part 100, an inspection part 200, a distinguishing process part 300, an optical process part 400 and a storage part 450. Further, the inspection apparatus 1000 includes an illumination 500, a monitor 600, an inspection base 700, a barcode reader 800 and the like.

The inspection apparatus 1000 is an apparatus for inspecting whether or not each of tablets 900 placed on the inspection base 700 is proper by collating the tablets 900 placed on the inspection base 700 with prescription information. In this regard, although description will be given to a case where a tablet is provided as one example of a target object of the inspection in this embodiment, the target object of the inspection is not limited to the tablet. For example, the target object of the inspection may be a medicine packaged by packaging paper.

The photographing part 100 is a camera for photographing the tablets 900 placed on the inspection base 700. The photographing part 100 is arranged on the vertically upper side of the inspection base 700.

The illumination 500 is used for illuminating the inspection base 700 at the time of the photographing due to the photographing part 100 and arranged on the upper side of the inspection base 700 as is the case for the photographing part 100. For example, the illumination 500 uses light emitting diodes arranged in a circular form or the like as a light source to illuminate the inspection base 700. For example, each light emitting diode is arranged so that its light axis is directed toward the obliquely downward direction. With this configuration, it becomes possible to emphasize a profile of each tablet 900 by illuminating the tablets 900 placed on the inspection base 700 from the obliquely upward direction.

The optical process part 400 is arranged on a rear side of the inspection base 700, that is the opposite side to the photographing part 100 and the illumination 500 through the inspection base 700. For example, the optical process part 400 includes a display part such as a liquid crystal display panel 420. Although the optical process part 400 will be described with assuming that the optical process part 400 is the liquid crystal display panel 420 in the following description, the optical process part 400 is not limited to the liquid crystal display panel 420. For example, the optical process part 400 may be a part which can optically emit information for making a specific tablet 920 placed on the inspection base 700 visually distinguishable from other tablets 910 placed on the inspection base 700. For example, the optical process part 400 may be an organic EL display panel which can display at least one of a character, a diagram and a symbol for making a location of the specific tablet 920 visually distinguishable.

The storage part 450 is a storage media for storing computer programs for allowing the inspection apparatus 1000 to operate and a variety of information such as master images of tablets used at the time of the inspection for the tablets. For example, the inspection part 200 and the distinguishing process part 300 are constituted of a processor (CPU) performing a variety of processes according to the computer programs stored in the storage part 450.

The monitor 600 is a liquid crystal display panel, an organic EL display panel or the like arranged on the front side of the illumination 500. The monitor 600 displays a variety of information related to the inspection apparatus 1000. For example, the monitor 600 displays an image photographed by the photographing part 100 and displays a result of the inspection performed by the inspection part 200.

The inspection base 700 is a base on which the tablets 900 which are the target objects of the inspection should be placed. The inspection base 700 has a discharging part 710 for discharging tablets to which the inspection has been performed by the inspection part 200 from the inspection base 700. Specifically, tablets determined to be proper as the result of the inspection performed by the inspection part 200 are contained in a vial bottle 810 from the inspection base 700 through the discharging part 710.

Figure 3:
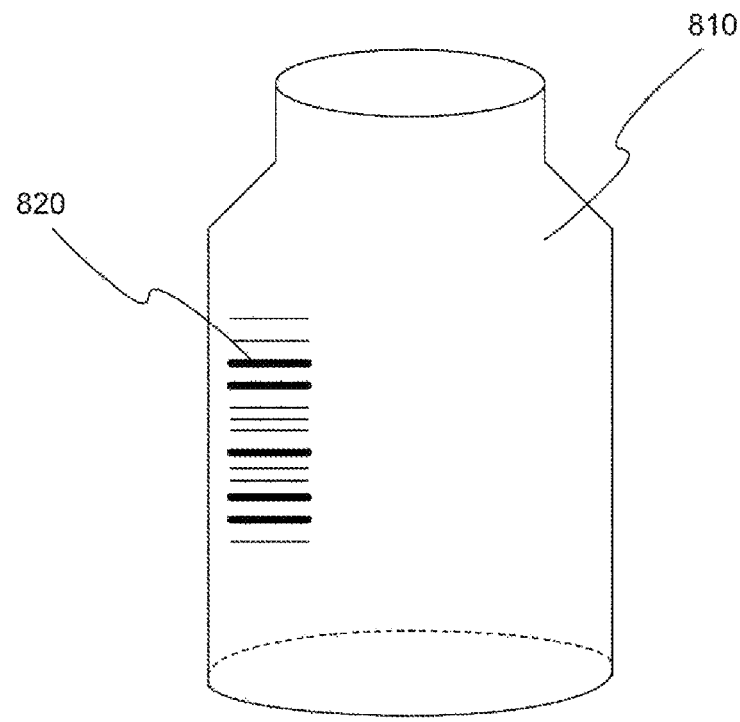
FIG. 3 is a view showing one example of a medicine bottle for containing tablets.
Figure 4:
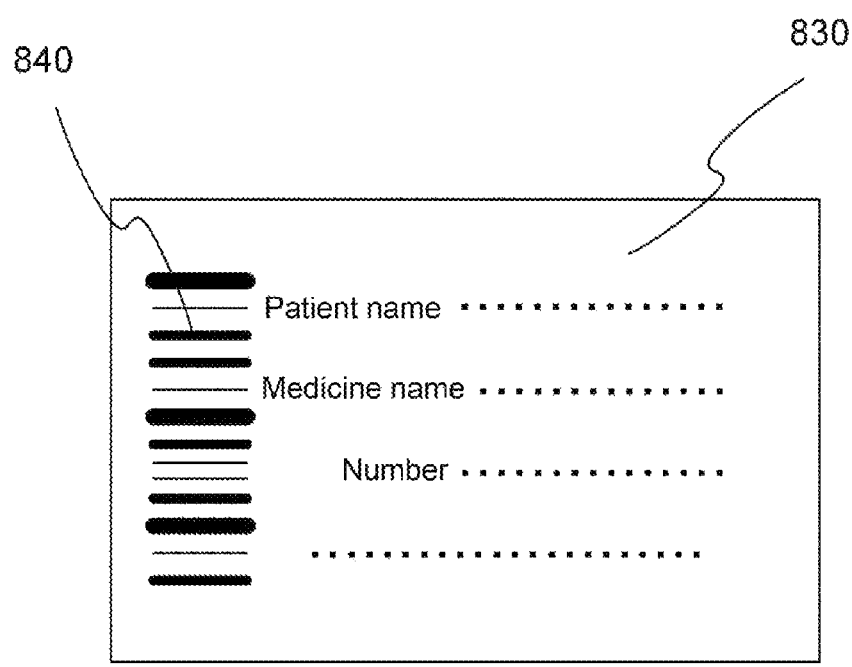
FIG. 4 is a view showing one example of a prescription.

The barcode reader 800 is an information obtaining part for obtaining a variety of information used in the inspection apparatus 1000. For example, the barcode reader 800 reads a barcode 820 printed to a medicine bottle 810 for containing tablets as shown in FIG. 3. Further, the barcode reader 800 reads a barcode 840 printed to a prescription 830 as shown in FIG. 4, for example.

The inspection part 200 performs the inspection for the tablets 900 placed on the inspection base 700 based on the image photographed by the photographing part 100. Specifically, the inspection part 200 performs the inspection whether or not the number, the kind or a combination of the number and the kind of the tablets placed on the inspection base 700 matches with the prescription information based on the image photographed by the photographing part 100, information on the kind or the number of the tablets based on the prescription information and the master images for the tablets. The master images for the tablets are preliminarily stored in the storage part 450 for each kind of the tablets. For example, the prescription information is inputted to the inspection apparatus 1000 by reading the barcode 840 printed to the prescription 830 as shown in FIG. 4 with the barcode reader 800.

The inspection part 200 collates the image photographed by the photographing part 100 with the master image for each kind of the tablets to identify the kind, the number or the combination of the kind and the number of the tablets 900 placed on the inspection base 700. Further, the inspection part 200 collates whether or not the identified kind, number or combination of the kind and the number of the tablets coincides with the kind, the number or the combination of the kind and the number of the tablets based on the prescription information.

In this regard, the inspection apparatus 1000 may include a vibrating part for applying vibration to the inspection base 700 to dissolve a state that the tablets 900 contact with each other or a state that the tablets 900 are overlapped with each other in a case where it is determined that the tablets 900 contact with each other or are overlapped with each other in the image photographed by the photographing part 100.

In a case of determining that the tablets 900 placed on the inspection base 700 are proper as the result of the inspection due to the inspection part 200, an operator such as a pharmacist contains the tablets placed on the inspection base 700 into the vial bottle 810. For example, the operator uses a paddle or the like to contain the tablets placed on the inspection base 700 into the vial bottle 810 through the discharging part 710. Further, in a case where a pivotal movement shaft is provided at an end portion of the inspection base 700 on the side of the vial bottle 810 and the inspection base 700 can be inclined around the pivotal movement shaft, the operator can also incline the inspection base 700 to connect the discharging part 710 with an opening of the vial bottle 810 and slide the tablets placed on the inspection base 700 to fall the tablets into the vial bottle 810. On the other hand, in a case of determining that one or some of the tablets 900 placed on the inspection base 700 are improper as the result of the inspection due to the inspection part 200, the operator removes the tablet determined as being improper from the inspection base 700.

Here, there is a case where it is difficult for the operator to identify which one of the tablets 900 placed on the inspection base 700 is an improper tablet. As a result, there is a risk that the operator needs a long time for the removing operation of the improper tablet or mistakenly removes a tablet which is not to be removed, for example.

In view of the problem as described above, the inspection apparatus 1000 of this embodiment includes the inspection process part 300. The inspection process part 300 performs a process for making the specific tablet 920 in the tablets 900 placed on the inspection base 700 visually distinguishable from the other tablets 910 placed on the inspection base 700 based on the result of the inspection performed by the inspection part 200. For example, the specific tablet 920 is the improper tablet determined as being different from the prescription information as the result of the inspection performed by the inspection part 200. Further, for example, the other tablets 910 are proper tablets determined as matching with the prescription information as the result of the inspection performed by the inspection part 200.

Specifically, the distinguishing process part 300 allows the liquid crystal display panel 420 to display information for making the location of the specific tablet 920 visually distinguishable. For example, the distinguishing process part 300 allows the liquid crystal display panel 420 to display at least one of the character, the diagram and the symbol for making the location of the specific tablet 920 visually distinguishable. More specifically, in a case where the inspection base 700 has a two-dimensional coordinate system, the distinguishing process part 300 identifies a coordinate value of the two-dimensional coordinate system of the specific tablet 920 based on the image photographed by the photographing part 100. In this regard, in one example of the embodiment, since a position of the photographing part 100 is fixed, a distance from the photographing part 100 to the inspection base 700 is also fixed. Further, since pixels of a CCD of the photographing part 100 is already-known, the distinguishing process part 300 can allow the inspection base 700 to have a coordinate system due to a general two-dimensional image measurement principle to identify the coordinate value of the two-dimensional coordinate system of the specific tablet 920. Further, the distinguishing process part 300 can allow a liquid crystal screen of the inspection base 700 to display coordinate lines in a grid pattern to identify the coordinate value of the two-dimensional coordinate system of the specific tablet 920. The distinguishing process part 300 performs the process for making the specific tablet 920 visually distinguishable from the other tablets 910 based on the identified coordinate value.

One example of the process of the distinguishing process part 300 is described with using FIG. 2. In the example of FIG. 2, five tablets ABC are placed on the inspection base 700 and one tablet DEF is placed on the inspection base 700. On the other hand, it is assumed that the prescription information read by the barcode reader 800 indicates six tablets ABC.

By the way, on the assumption that the tablets 900 are placed on the inspection base 700 as shown in FIG. 2, the prescription information is transmitted to the inspection apparatus 1000 through a network or by reading the barcode 840 of the prescription 830 with the barcode reader 800. On the other hand, the pharmacist takes the medicine bottle 810 corresponding to the medicine described in the prescription 830 from a medicine shelf or the like and allows the barcode reader 800 to read the information of the barcode 820 written on the medicine bottle 810. The inspection part 200 collates the prescription information transmitted to the inspection apparatus 1000 with the information of the barcode 820 written on the medicine bottle 810 to confirm whether the medicine bottle 810 corresponding to the prescription information is taken without mistakes. In a case where an improper medicine bottle 810 is taken, the inspection part 200 can display an error on the monitor 600 or the like or emit a warning beep. On the other hand, in a case where a proper medicine bottle 810 is taken, the inspection part 200 can display a notice for this matter on the monitor 600. When the notice that the proper medicine bottle 810 is taken is displayed on the monitor 600, the pharmacist discharges the tablets by the number based on the prescription information from this medicine bottle 810 onto the inspection base 700. When the tablets 900 are placed on the inspection base 700, the tablets 900 on the inspection base 700 are photographed by the photographing part 100.

The inspection part 200 collates the image photographed by the photographing part 100 with the master image for each kind of the tablets to identify the kind, the number or the combination of the kind and the number of the tablets placed on the inspection base 700 (the five tablets ABC and the one tablet DEF). In the example shown in FIG. 2, the inspection part 200 can allow the monitor 600 to display the combination of the identified kind and number of the tablets.

Further, the inspection part 200 collates whether or not the combination of the identified kind and number of the tablets (the five tablets ABC and the one tablet DEF differing from the prescription information) coincides with the combination of the kind and the number of the tablets based on the prescription information (six tablets ABC). As a result of the collation, the total numbers of the tablets coincide with each other but the combinations of the kind and the number of the tablets do not coincide with each other. Thus, the inspection part 200 can allow the monitor 600 to display information (NG) indicating that the result of the collation is not coincident as shown in FIG. 2. In this regard, although the example in which the tablet (the tablet DEF) differing from the prescription information is detected by the collation of the inspection part 200 in the case where the tablet differing from the prescription information is placed on the inspection base 700 is described in this embodiment, the present invention is not limited thereto. For example, the inspection part 200 can detect a foreign substance in order to prevent the foreign substance from being contained in the vial bottle 810 in a case where the foreign substance is placed on the inspection base 700. Namely, in a case where it is determined that an unknown tablet not registered as the master image for each kind of the tablets is placed on the inspection base 700 as the result of collating the image photographed by the photographing part 100 with the master image for each kind of the tablets, the inspection part 200 can detect this unknown tablet as the foreign substance.

Here, as shown in FIG. 2, the distinguishing process part 300 can turn on or blink a portion on the rear side of the specific tablet 920 (the improper tablet) in the liquid crystal panel 420 to add a marking 410 around the specific tablet 920. Namely, the inspection part 200 can collate whether or not the number of the tablets placed on the inspection base 700 coincides with the number of the tablets based on the prescription information for each kind of medicines. The distinguishing process part 300 can turn on or blink the portion on the rear side of the specific tablet 920 (the improper tablet) in the liquid crystal display panel 420 for the kind of the medicines determined as being NG as the result of the collation to add the marking 410 around the specific tablet 920.

Since the operator can easily and visually understand that the specific tablet 920 to which the marking 410 is added is the improper tablet, the operator can quickly and correctly remove the specific tablet 920. Further, since the operator can understand that the tablets ABC are short by one based on the information displayed on the monitor 600, the operator can place one tablet ABC on the inspection base 700. After the specific tablet 920 is removed and the tablet ABC is added, the inspection apparatus 1000 can again perform the inspection for the tablets 900 placed on the inspection base 700.

In a case where the result of the inspection due to the inspection apparatus 1000 is proper, the inspection part 200 can allow the monitor 600 to display information (OK) indicating that the result of the collation is coincident. When the information (OK) indicating that the result of the collation is coincident is displayed on the monitor 600, the operator uses the paddle or the like or inclines the inspection base 700 around the pivotal movement shaft to contain the tablets placed on the inspection base 700 into the vial bottle 810 through the discharging part 710. In this regard, a label to be attached to the vial bottle 810 may be issued by a label issuing device (not shown in the drawings) using an event that the result of the inspection due to the inspection apparatus 1000 is proper as a trigger. Further, it may be possible to take a configuration in which a sensor which can detect the passing of the tablets and count the number of the tablets is provided at the discharging part 710 and the label to be attached to the vial bottle 810 is issued by the label issuing device (not shown in the drawings) when the sensor detects that the tablets placed on the inspection base 700 are correctly contained in the vial bottle 810.

Figure 5:
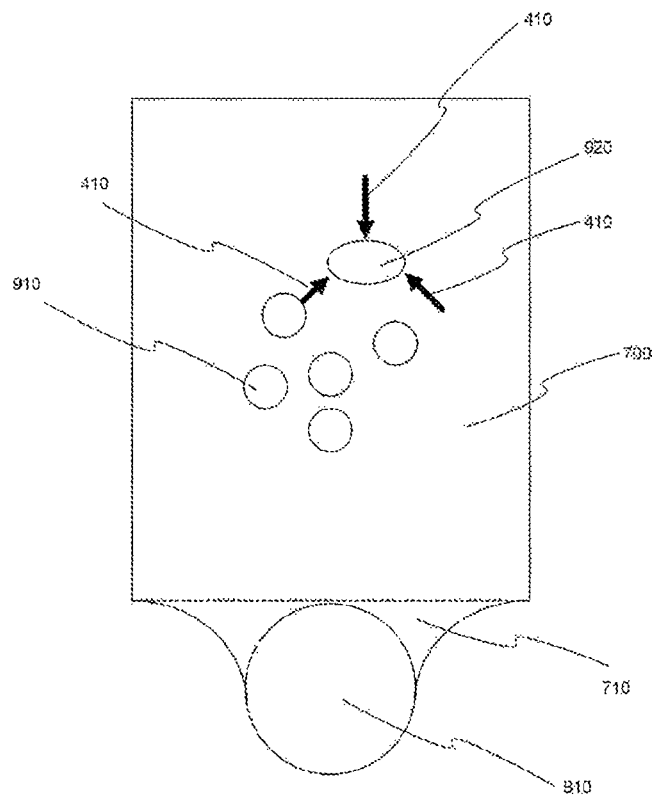
FIG. 5 is a view showing one example of a process for making a specific tablet visually distinguishable from other tablets.
Figure 6:
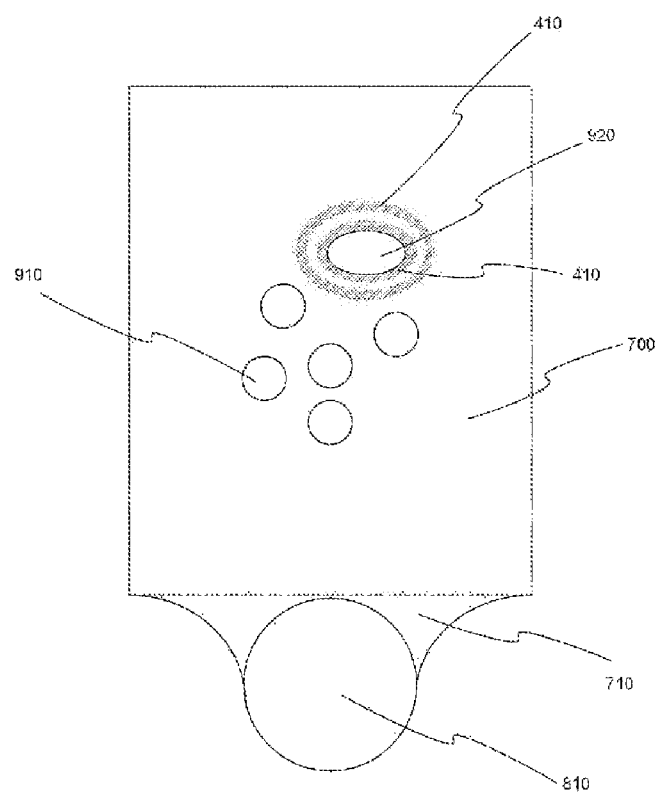
FIG. 6 is a view showing another example of the process for making the specific tablet visually distinguishable from the other tablets.

In this regard, although the example in which the circular marking 410 is added around the specific tablet 920 is shown in FIG. 2, the present invention is not limited thereto. Each of FIGS. 5, 6 is a view showing one example of the process for making the specific tablet 920 visually distinguishable from the other tablets. As shown FIG. 5, the distinguishing process part 300 can turn on or blink a plurality of arrow markings 410 pointing the specific tablet 920 on the liquid crystal display panel 420. For example, in a case where the specific tablet 920 is close to the other tablets 910 or overlapped with the other tablets 910, the operator can easily distinguish the specific tablet 920 from the other tablets 910 by adding the arrow markings 410.

Further, as shown in FIG. 6, the distinguishing process part 300 can also add a plurality of circular markings 410 around the specific tablet 920. The distinguishing process part 300 can turn on or blink the plurality of circular markings 410 at the same time or turn on or blink the plurality of circular markings 410 in sequence. For example, in a case where the specific tablet 920 is close to the other tablets 910 or overlapped with the other tablets 910, the operator can easily distinguish the specific tablet 920 from the other tablets 910 by adding the plurality of circular markings 410.

Figure 7:
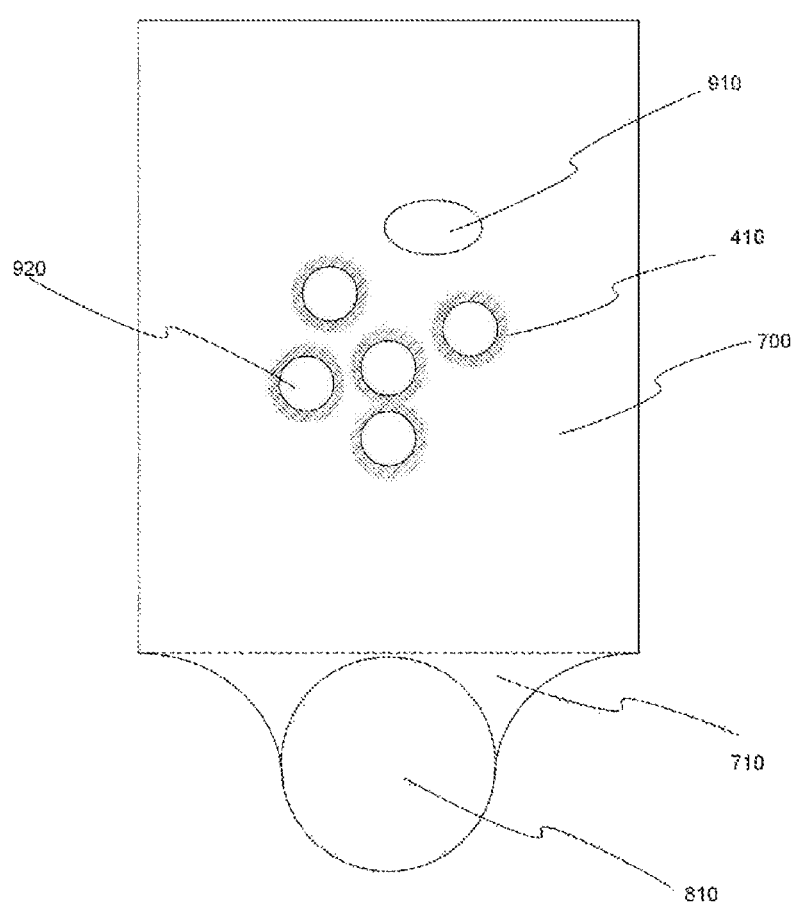
FIG. 7 is a view showing yet another example of the process for making the specific tablet visually distinguishable from the other tablets.

In this regard, although the examples in which the tablet determined as being improper as the result of the inspection is considered as the specific tablet 920 as the result of the inspection and the marking 410 is added thereto are shown in FIGS. 2, 5, 6, the present invention is not limited thereto. FIG. 7 is a view showing another example of the process for making the specific tablet visually distinguishable from the other tablets. As shown in FIG. 7, the distinguishing process part 300 can add markings 410 to the tablets determined as being proper as the result of the inspection.

Namely, in the example of FIG. 7, the tablets corresponding to the prescription information are considered as the specific tablets 920 as the result of the inspection performed by the inspection part 200. Further, the tablet differing from the prescription information is considered as the other tablet 910 as the result of the inspection performed by the inspection part 200.

In this case, since the operator can easily and visually understand that the specific tablets 920 to which the markings 410 are respectively added are the proper tablets, the operator can quickly remove the other tablet 910 to which the marking 410 is not added.

Figure 8:
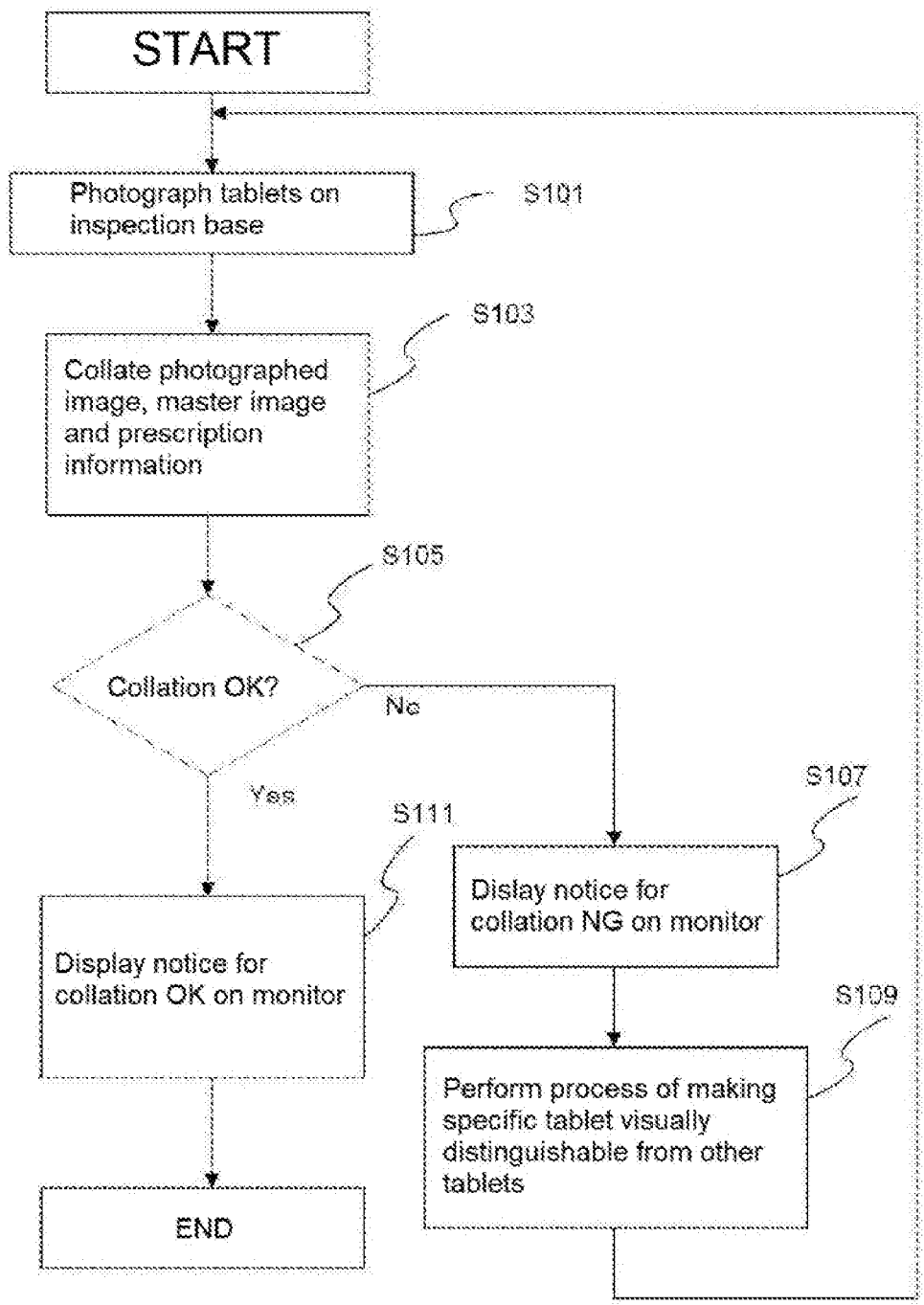
FIG. 8 is a flowchart of an inspection method performed by the inspection apparatus.

Next, an inspection method performed by the inspection apparatus 1000 will be explained. FIG. 8 is a flowchart of the inspection method performed by the inspection apparatus 1000. As shown in FIG. 8, the inspection method in this embodiment first photographs the tablets placed on the inspection base 700 with the photographing part 100 (step S101).

Subsequently, the inspection method collates the photographed image with the master image for each kind of the tablets, and the kind, the number or the combination of the kind and the number of the tablets based on the prescription information with the inspection part 200 (step S103). In one example of the inspection method, the combination of the kind and the number of the tablets 900 placed on the inspection base 700 is identified by collating the image photographed by the photographing part 100 with the master image for each kind of the tablets. Further, the inspection part 200 collates whether or not the combination of the identified kind and number of the tablets 900 coincides with the combination of the kind and the number of the tablets based on the prescription information.

Subsequently, the inspection method determines whether or not the combination of the kind and the number of the tablets 900 placed on the inspection base 700 coincides with the combination of the kind and the number of the tablets based on the prescription information (whether or not the collation is OK) as the result of the collation (step S105). In a case where it is determined that the tablets 900 placed on the inspection base 700 does not coincide with the combination of the kind and the number of the tablets based on the prescription information as the result of the collation (the step S105 is No), the inspection method displays the notice indicating that the result of the collation is NG on the monitor 600 (step S107).

Subsequently, the inspection method performs the process for making the specific tablet 920 placed on the inspection base 700 visually distinguishable from the other tablets 910 placed on the inspection base 700 based on the result of the inspection performed in the step S105 (step S109). The process in the step S109 (the distinguishing process) is the process explained in the above with using FIGS. 2, 5, 6, 7. The distinguishing process can optically emit the information for making the location of the specific tablet 920 visually distinguishable with the optical process part 400 arranged on the rear side of the inspection base 700. The distinguishing process can allow the liquid crystal panel 420 to display at least one of the character, the diagram and the symbol for making the location of the specific tablet 920 visually distinguishable. The distinguishing process can identify the coordinate value of the two-dimensional coordinate system of the specific tablet 920 based on the image photographed by the photographing step and perform the process for making the specific tablet 920 visually distinguishable from the other tablets 910 based on the identified coordinate value. After the step S109 and after the improper tablet is removed from the inspection base 700 by the operator, the inspection method returns to the step S101.

On the other hand, in a case where it is determined that the tablets 900 placed on the inspection base 700 coincide with the prescription information as the result of the collation (the step S105 is Yes), the inspection method displays the notice indicating that the result of the collation is OK on the monitor 600 (step S111) and then finishes the process. In this regard, in the case where the result of the collation is OK, it may be possible to turn on or blink the entire of the liquid crystal display panel 420 with color indicating that the result of the collation is OK.

In this regard, although the process in which the inspection for the tablets 900 placed on the inspection base 700 is performed and the specific tablet 920 is processed to be visually distinguishable from the other tablets 910 is explained in the above description, the present invention is not limited thereto. A computer program product of this embodiment may include only the process for making the specific tablet 920 visually distinguishable from the other tablets 910. For example, the computer program product may be a computer program product for allowing a computer to perform a receiving step for receiving the result of the inspection for the tablets based on the image obtained by photographing the tablets placed on the inspection base 700 and a distinguishing process step for performing the process of making the specific tablet placed on the inspection base 700 visually distinguishable from the other tablets based on the result of the inspection received by the receiving step.

Figure 9:
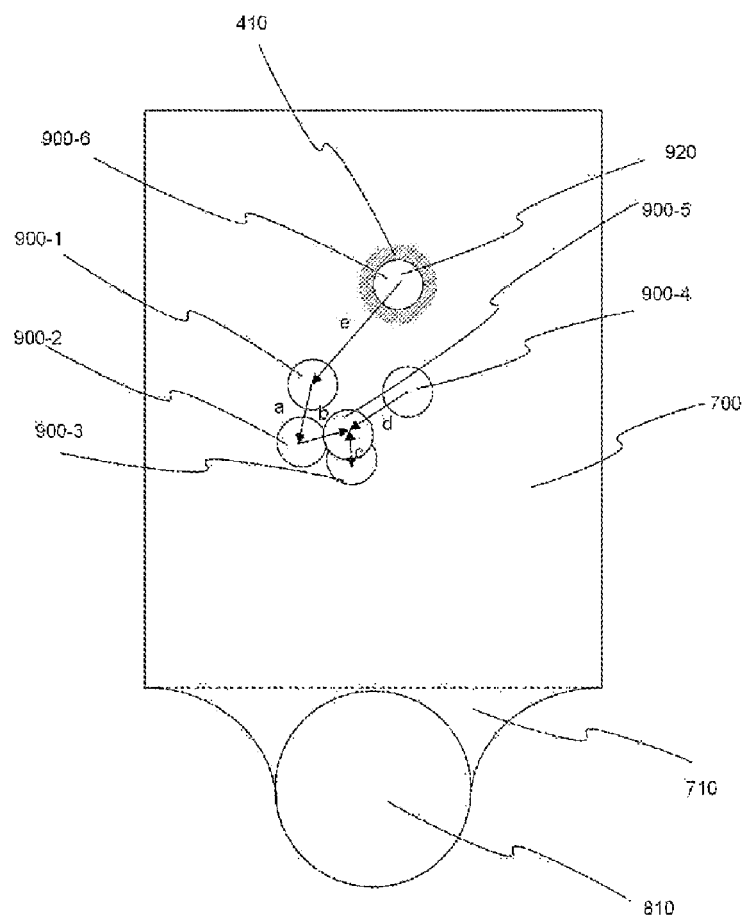
FIG. 9 is a view showing one example of a process in a case where each of some of a plurality of target objects of the same kind should be a specific target object.
Figure 10:
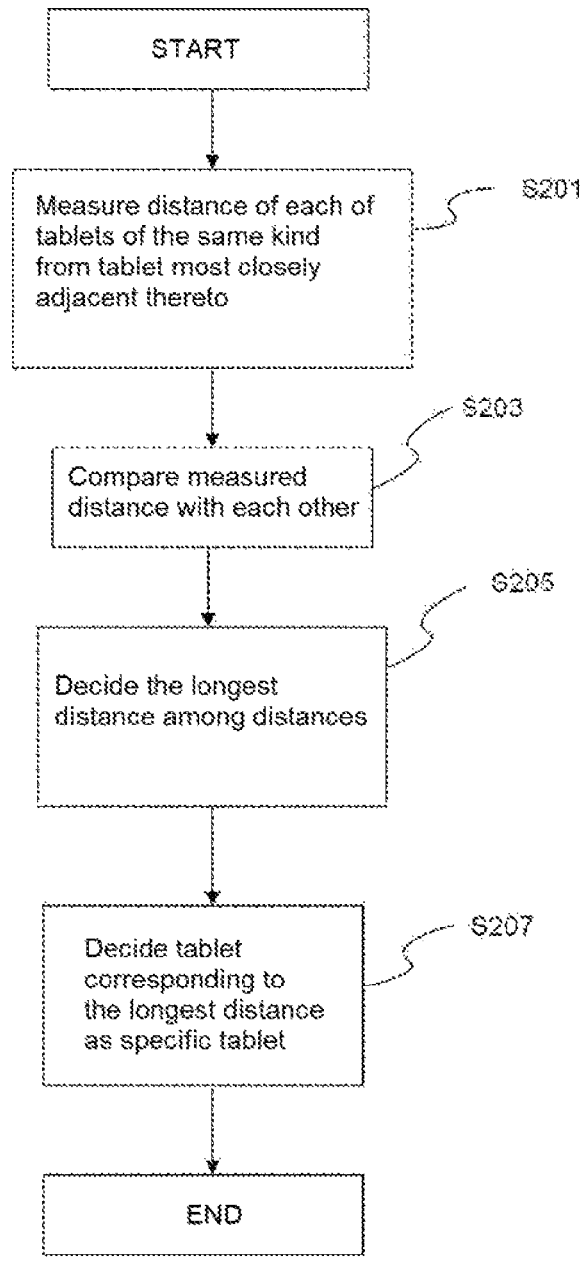
FIG. 10 is a flowchart of the process in the case where each of some of the plurality of target objects of the same kind should be the specific target object.

Next, description will be given to the process of the distinguishing process part 300 in a case where each of some of the plurality of tablets of the same kind placed on the inspection base 700 is determined to be the specific tablet as the result of the inspection performed by the inspection part 200. FIG. 9 is a view showing one example of the process in the case where each of some of the plurality of tablets of the same kind should be the specific tablet. FIG. 10 is a flowchart of the process in the case where each of some of the plurality of tablets of the same kind should be the specific tablet.

As shown in FIG. 9, for example, it is assumed that six tablets ABC are placed on the inspection base 700 and the prescription information indicates five tablets ABC. In this case, although the distinguishing process part 300 needs to decide one tablet ABC of the six tablets ABC900-1 to 900-6 placed on the inspection base 700 as the specific tablet 920, there is a problem that which tablet should be decided as the specific tablet 920. Here, the distinguishing process part 300 can preferentially decide the tablet whose distance from the adjacent tablet is long among the plurality of tablets of the same kind (the six tablets ABC900-1 to 900-6) as the specific tablet 920.

Specifically, as shown in FIG. 10, the distinguishing process part 300 measures the distance from the most closely adjacent tablet for each of the tablets ABC900-1 to 900-6 (step S201). For example, the distances among the tablets can be measured based on the two-dimensional coordinate value of each tablet. In the example of FIG. 9, the tablet most closely adjacent to the tablet ABC900-1 is the tablet ABC900-2 and the distance between them is "a". The tablet most closely adjacent to the tablet ABC900-2 is the tablet ABC900-5 and the distance between them is "b". The tablet most closely adjacent to the tablet ABC900-3 is the tablet ABC900-5 and the distance between them is "c". The tablet most closely adjacent to the tablet ABC900-4 is the tablet ABC900-5 and the distance between them is "d". The tablet most closely adjacent to the tablet ABC900-5 is the tablet ABC900-3 and the distance between them is "c". The tablet most closely adjacent to the tablet ABC900-6 is the tablet ABC900-1 and the distance between them is "e".

Subsequently, the distinguishing process part 300 compares the plurality of measured distances (a, b, c, d, e) with each other (step S203) to decide the longest distance (step S205). In the example of FIG. 9, the distance e is the longest distance. Thus, the distinguishing process part 300 decides the tablet ABC900-6 corresponding to the longest distance e as the specific tablet 920 (step S207). With this process, the tablets ABC900-1 to 900-5 are decided as the other tablets 910.

As shown in FIG. 9, the distinguishing process part 300 can turn on or blink the portion on the rear side of the specific tablet 920 (the improper tablet) on the liquid crystal display panel 420 to add the marking 410 around the specific tablet 920. In this regard, in a case where not one tablet but a plurality of tablets should be decided as the specific tablet 920, it is possible to preferentially decide one of the plurality of tablets as the specific tablet 920 in sequence according to the order of the length of the distance from the adjacent tablet.

By preferentially deciding one of the plurality of tablets of the same kind (the six tablets ABC900-1 to 900-6) whose distance from the adjacent tablet is long as the specific tablet 920 like this embodiment, the operator can easily perform a removing operation for the specific tablet 920. Namely, if one of the plurality of tablets whose distance from the adjacent tablet is short or which is overlapped with the adjacent tablet is decided as the specific tablet 920 and the marking 410 is added thereto, there is a case where it is difficult to find the tablet to which the marking 410 is added. Thus, there is a risk that the operator wonders which tablet should be removed or how many tablets should be removed. In contrast, since the tablet whose distance from the adjacent tablet is long has a low possibility of being overlapped with the adjacent tablet, the operator can understand that the marking 410 is added to which tablet at one view by adding the marking 410 to this tablet. As a result, the operator can easily distinguish the tablet to be removed and thus can quickly perform the removing operation without making a mistake.

Figure 11:
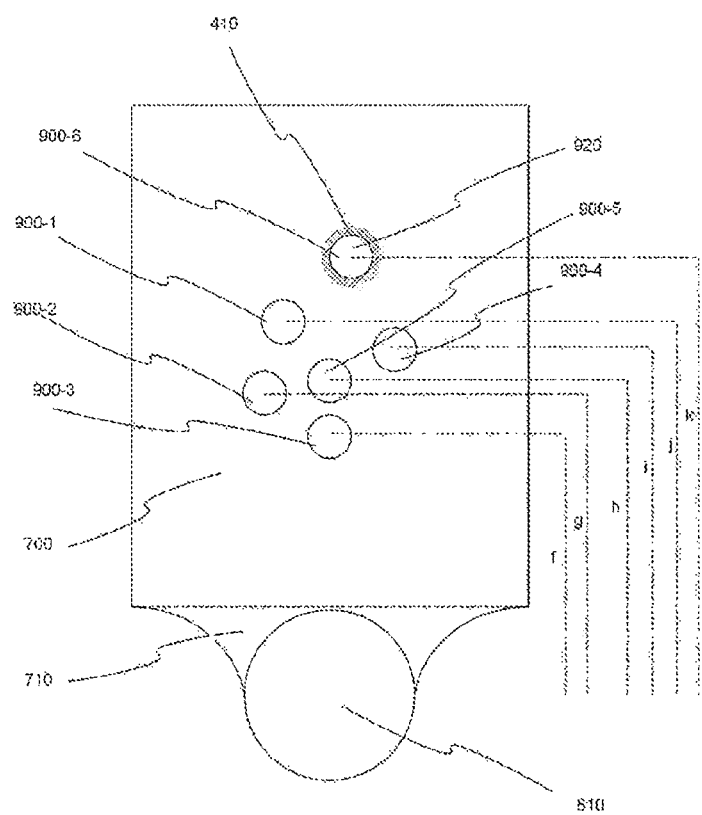
FIG. 11 is a view showing one example of the process in the case where each of some of the plurality of target objects of the same kind should be the specific target object.
Figure 12:
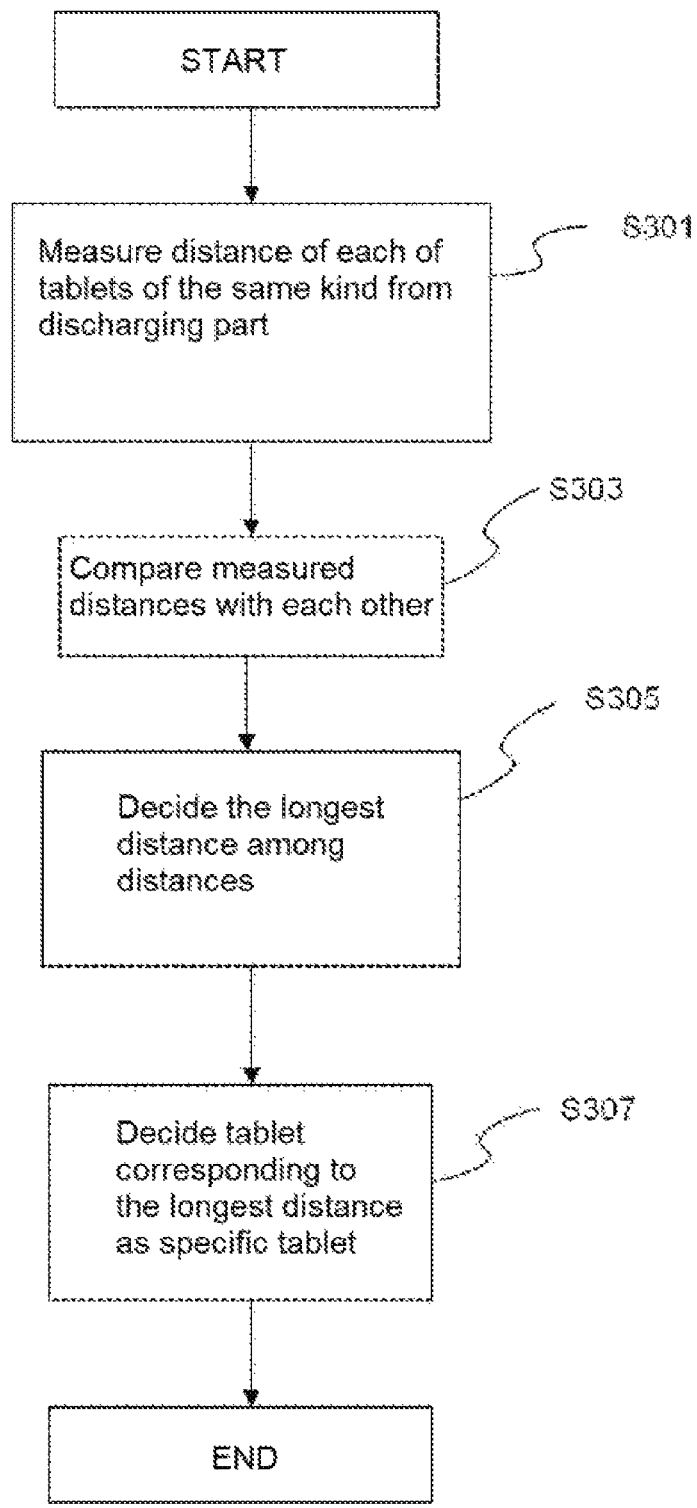
FIG. 12 is a flowchart of the process in the case where each of some of the plurality of target objects of the same kind should be the specific target object.

Next, description will be given to another process of the distinguishing process part 300 in a case where it is determined that each of some of the plurality of tablets of the same kind placed on the inspection base 700 should be the specific tablet as the result of the inspection performed by the inspection part 200. FIG. 11 is a view showing one example of the process in a case where each of some of the plurality of target objects of the same kind should be a specific target object. FIG. 12 is a flowchart of the process in the case where each of some of the plurality of target objects of the same kind should be the specific target object.

For example, it is assumed that the six tablets ABC are placed on the inspection base 700 as shown in FIG. 11 and the prescription information indicates five tablets ABC. In this case, although the distinguishing process part 300 needs to decide one tablet ABC of the six tablets ABC900-1 to 900-6 placed on the inspection base 700 as the specific tablet 920, there is a problem that which tablet should be decided as the specific tablet 920. Here, the distinguishing process part 300 can preferentially decide the tablet whose distance from the discharging part 710 is long among the plurality of tablets of the same kind (the six tablets ABC900-1 to 900-6) as the specific tablet 920.

Specifically, as shown in FIG. 12, the distinguishing process part 300 measures the distance from the discharging part 710 for each of the tablets ABC900-1 to 900-6 (step S301). For example, the distances from the discharging part 710 can be measured based on the two-dimensional coordinate value of the discharging part 710 and the two-dimensional coordinate value of each tablet. In the example of FIG. 11, the distance between the tablet ABC900-1 and the discharging part 710 is "j". The distance between the tablet ABC900-2 and the discharging part 710 is "g". The distance between the tablet ABC900-3 and the discharging part 710 is "f". The distance between the tablet ABC900-4 and the discharging part 710 is "i". The distance between the tablet ABC900-5 and the discharging part 710 is "h". The distance between the tablet ABC900-6 and the discharging part 710 is "k".

Subsequently, the distinguishing process part 300 compares the plurality of measured distances (f, g, h, i, j, k) with each other (step S303) to decide the longest distance (step S305). In the example of FIG. 11, the distance k is the longest distance. Thus, the distinguishing process part 300 decides the tablet ABC900-6 corresponding to the longest distance k as the specific tablet 920 (step S307). With this process, the tablets ABC900-1 to 900-5 are decided as the other tablets 910.

As shown in FIG. 11, the distinguishing process part 300 can turn on or blink the portion on the rear side of the specific tablet 920 (the improper tablet) on the liquid crystal display panel 420 to add the marking 410 around the specific tablet 920. In this regard, in a case where not one tablet but a plurality of tablets should be decided as the specific tablets 920, it is possible to preferentially decide one of the plurality of tablets as the specific tablet 920 in sequence according to the order of the length of the distance from the discharging part 710.

By preferentially deciding one of the plurality of tablets of the same kind (the six tablets ABC900-1 to 900-6) whose distance from the discharging part 710 is long as the specific tablet 920 like this embodiment, the operator can easily perform a containing operation for the other tablets 910 (the proper tablets) into the vial bottle 810. Namely, since a distance from the tablet whose distance from the discharging part 710 is long to the vial bottle 810 is also long, a burden of the containing operation into the vial bottle 810 is relatively big in a case of containing such a tablet into the vial bottle 810 with a brush or the like. In contrast, since the other tablets 910 whose distances from the discharging part 710 are short remain as a result of the removing operation for the specific tablet 920 in this embodiment, it is possible to reduce the burden of the containing operation into the vial bottle 810.

In this regard, in the above embodiment, the example in which the inspection part 200 performs the inspection whether or not the kind or the combination of the kind and the number of the tablets placed on the inspection base 700 matches with the prescription information is described. However, the present invention is not limited thereto and the inspection part 200 can perform the inspection whether or not the number of the tablets placed on the inspection base 700 matches with the prescription information. Hereinafter, this matter will be described.

Figure 13:
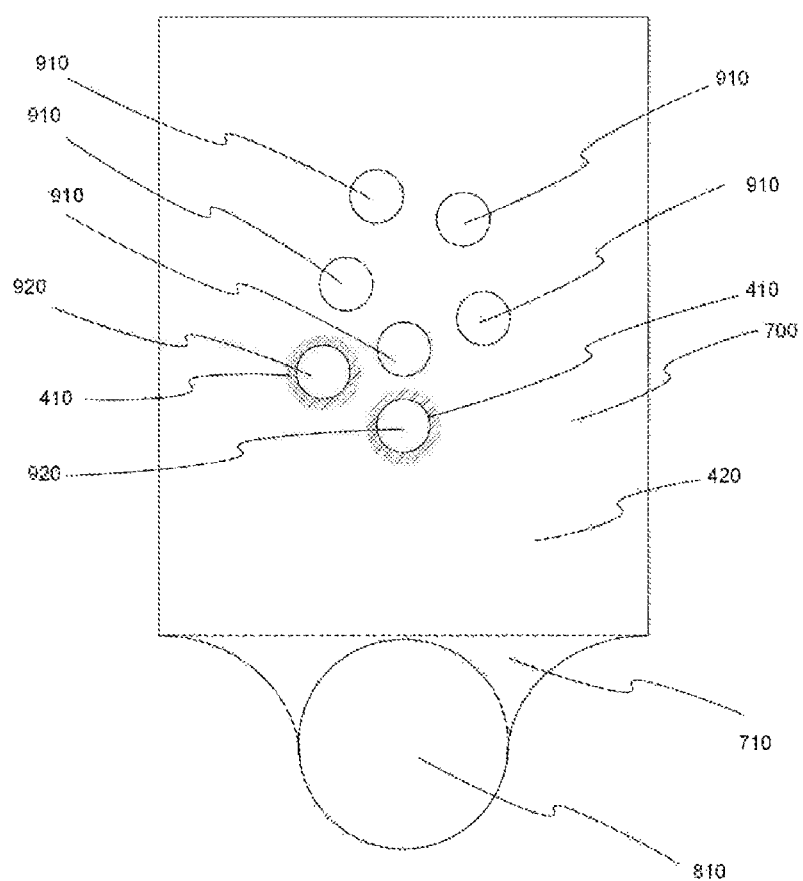
FIG. 13 is a view showing one example of an inspection process for inspecting whether or not the number of the tablets of the same kind matches with the number of the tablet in prescription information.
Figure 14:
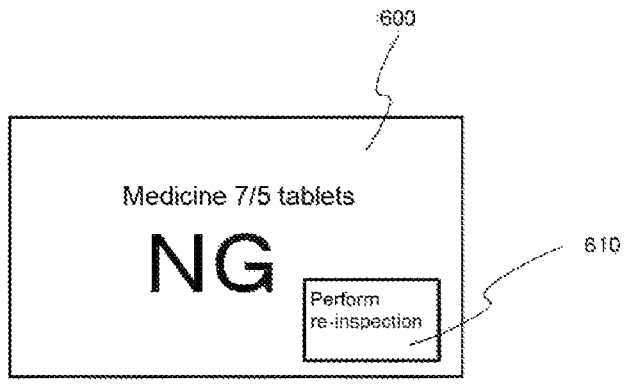
FIG. 14 is a view showing one example in which a result of an inspection performed by an inspection part is displayed on a monitor.
Figure 14:
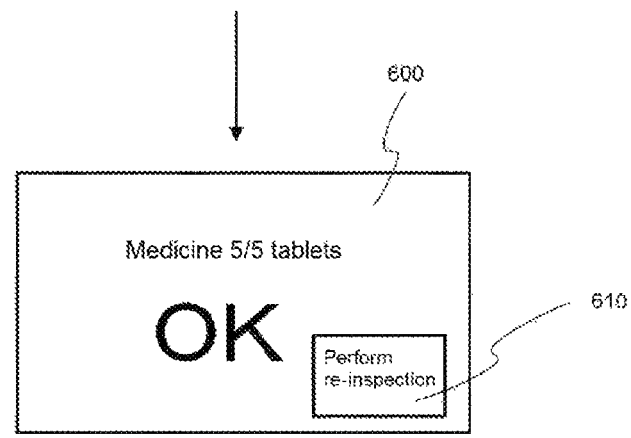

FIG. 13 is a view showing one example of the inspection process for inspecting whether or not the number of the tablets of the same kind matches with the number of the tablet in prescription information. FIG. 14 is a view showing one example in which the result of the inspection performed by the inspection part 200 is displayed on the monitor 600.

FIG. 13 shows an example in which the prescription information indicates five tablets but the number of the tablets discharged from the medicine bottle 810 onto the inspection base 700 is seven. In this embodiment, the inspection part 200 performs the inspection whether or not the number of the tablets placed on the inspection base 700 matches with the prescription information based on the image photographed by the photographing part 100 and the information on the number of the tablets based on the prescription information.

Specifically, the inspection part 200 identifies the number of the tablets placed on the inspection base 700 based on the image photographed by the photographing part 100 and collates whether or not the identified number of the tablets (seven in the example of FIG. 13) matches with the number of the tablets based on the prescription information (five in the example of FIG. 13). As a result of the collation, since both of the numbers do not coincide with each other, the inspection part 200 allows the monitor 600 to display information (NG) indicating that the result of the collation is not coincident as shown in the upper portion of FIG. 14.

The operator recognizes that the result of the collation is not coincident from the indication of the monitor 600 and removes the improper (surplus) tablets. Here, in this embodiment, the distinguishing process is performed by the distinguishing process part 300 in order to enable the operator to easily remove the improper (surplus) tablets. Namely, as shown in FIG. 13, the distinguishing process part 300 turns on or blinks the portions on the rear side of the specific tablets 920 (the surplus tablets) on the liquid crystal display panel 420 to add the markings 410 around the specific tablets 920. Specifically, the distinguishing process part 300 can turn on or blink the portions on the rear side of the two specific tablets 920 existing at positions near to the discharging part 710 to enable the operator to easily remove the surplus tablets.

Since the operator can easily and visually understand that the specific tablets 920 to which the markings 410 are respectively added are the surplus tablets, the operator can quickly and correctly remove the specific tablets 920. When a re-inspection performing button 610 of the monitor 600 shown in the upper portion of FIG. 14 is pushed by the operator after the removing of the surplus tablets finishes, the inspection apparatus 1000 again performs the inspection. Specifically, the inspection part 200 identifies the number of the tablets placed on the inspection base 700 based on the image photographed by the photographing part 100 and collates whether or not the identified number of the tablets coincides with the number of the tablets based on the prescription information. As a result of the collation, if both of the numbers coincide with each other, the inspection part 200 allows the monitor 600 to display information (OK) indicating that the result of the collation is coincident as shown in the lower portion of FIG. 14.

When the information (OK) indicating that the result of the collation is coincident is displayed on the monitor 600, the operator uses the paddle or the like or inclines the inspection base 700 around the pivotal movement shaft to contain the tablets placed on the inspection base 700 into the vial bottle 810 through the discharging part 710.

In this regard, although the example in which the tablets of the same kind are placed on the inspection base 700 is described in the above embodiment, it may be possible to perform the inspection based on the total number of the tablets regardless of the kind of the tablets (the medicine kind) in a case where the tablets of the plural kinds are placed on the inspection base 700. Namely, the inspection part 200 identifies the number of the tablets placed on the inspection base 700 regardless of the kind of the tablets and collates whether or not the identified number of the tablets coincides with the total number of the tablets based on the prescription information.

For example, it is assumed that the prescription information indicates that the number of the tablets ABC is five and the number of the tablets DEF is three and five tablets ABC and four tablets DEF are placed on the inspection base 700. In this case, the inspection part 200 identifies the total number of the tablets placed on the inspection base 700 based on the image photographed by the photographing part 100 and collates whether or not the identified number of the tablets (nine in this example) coincides with the number of the tablets based on the prescription information (eight in this example).

Figure 15:
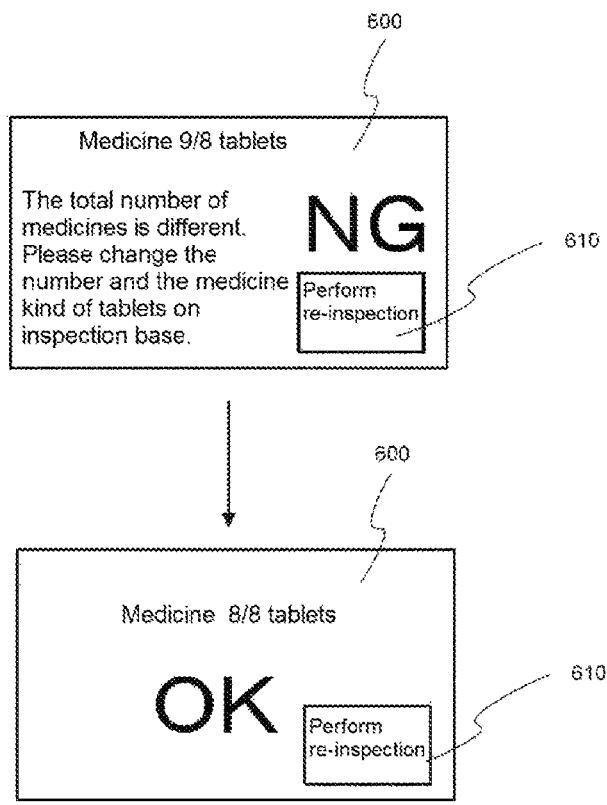
FIG. 15 is a view showing another example in which the result of the inspection performed by the inspection part is displayed on the monitor.

FIG. 15 is a view showing another example in which the result of the inspection performed by the inspection part 200 is displayed on the monitor 600. Since it is determined that both of the numbers do not coincide with each other as the result of the collation, the inspection part 200 can allow the monitor 600 to display information (NG) indicating that the result of the collation is not coincident and a message indicating that the number and the kind of the tablets on the inspection base 700 should be changed because the total number of the tablets is different as shown in the upper portion of FIG. 15.

The operator recognizes that the result of the collation is not coincident from the indication of the monitor 600 and changes the number and the kind of the tablets on the inspection base 700. After that, when the re-inspection performing button 610 of the monitor 600 shown in the upper portion of FIG. 15 is pushed by the operator, the inspection apparatus 1000 again performs the inspection. Specifically, the inspection part 200 identifies the number of the tablets placed on the inspection base 700 based on the image photographed by the photographing part 100 and collates whether or not the identified number of the tablets coincides with the number of the tablets based on the prescription information. As a result of the collation, if both of the numbers coincide with each other, the inspection part 200 allows the monitor 600 to display information (OK) indicating that the result of the collation is coincident as shown in the lower portion of FIG. 15.

Here, although the case where the number of the tablets placed on the inspection base 700 is larger than the number of the tablets based on the prescription information is described as the example in the above embodiment, the present invention is not limited thereto. The inspection apparatus 1000 can also perform the inspection even if the number of the tablets placed on the inspection base 700 is less than the number of the tablets based on the prescription information.

Figure 16:
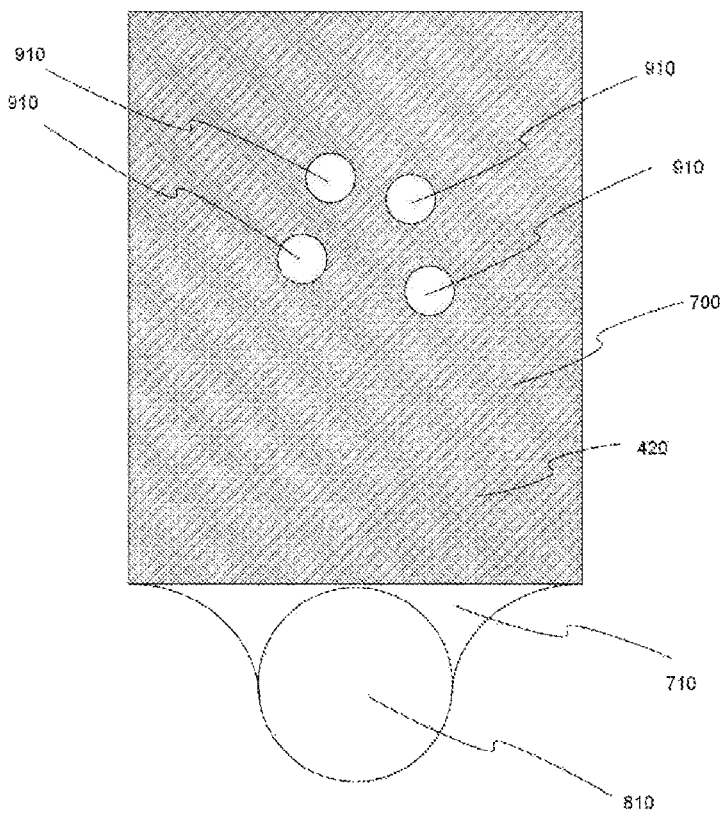
FIG. 16 is a view showing one example of the inspection process in a case where the number of the tablets placed on an inspection base is less than the number of the tablets based on the prescription information.
Figure 17:
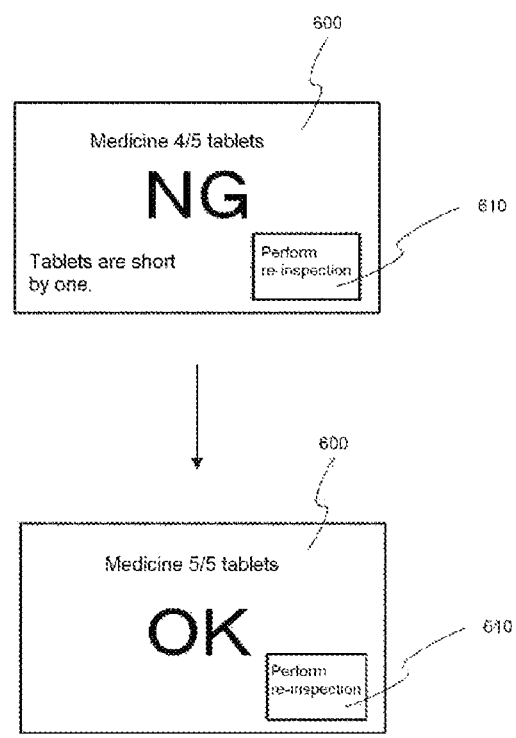
FIG. 17 is a view showing one example in which the result of the inspection performed by the inspection part is displayed on the monitor.

FIG. 16 is a view showing one example of the inspection process in the case where the number of the tablets placed on the inspection base 700 is less than the number of the tablets based on the prescription information. FIG. 17 is a view showing one example in which the result of the inspection performed by the inspection part 200 is displayed on the monitor 600.

FIG. 16 shows an example in which the prescription information indicates five tablets but the number of the tablets discharged from the medicine bottle 810 to the inspection base 700 is four. In this embodiment, the inspection part 200 performs the inspection whether or not the number of the tablets placed on the inspection base 700 matches with the prescription information based on the image photographed by the photographing part 100 and the information on the number of the tablets based on the prescription information.

Specifically, the inspection part 200 identifies the number of the tablets placed on the inspection base 700 based on the image photographed by the photographing part 100 and collates whether or not the identified number of the tablets (four in the example of FIG. 16) matches with the number of the tablets based on the prescription information (five in the example of FIG. 16). As a result of the collation, since both of the numbers do not coincide with each other, the inspection part 200 allows the monitor 600 to display information (NG) indicating that the result of the collation is not coincident and a message indicating that the tablets are short by one as shown in the upper portion of FIG. 17.

Further, the distinguishing process part 300 can turn on or blink the entire of the liquid crystal display panel 420 with easily-distinguished color such as red color or the like as shown in FIG. 16 in order to notice the short of the tablets to the operator. The operator can understand that the result of the collation is not coincident from the turning on or the blinking of the entire of the liquid crystal display panel 420 and easily and specifically understand what kind of non-coincidence of the collation occurs by seeing the message on the monitor 600.

When the re-inspection performing button 610 of the monitor 600 shown in the upper portion of FIG. 17 is pushed by the operator after one tablet is added onto the inspection base 700, the inspection apparatus 1000 can again perform the inspection. Specifically, the inspection part 200 identifies the number of the tablets placed on the inspection base 700 based on the image photographed by the photographing part 100 and collates whether or not the identified number of the tablets coincides with the number of the tablets based on the prescription. As a result of the collation, if both of the numbers coincide with each other, the inspection part 200 allows the monitor 600 to display information (OK) indicating that the result of the collation is coincident as shown in the lower portion of FIG. 17.

When the information (OK) indicating that the result of the collation is coincident is displayed on the monitor 600, the operator uses the paddle or the like or inclines the inspection base 700 around the pivotal movement shaft to contain the tablets placed on the inspection base 700 into the vial bottle 810 through the discharging part 710.

Figure 18:
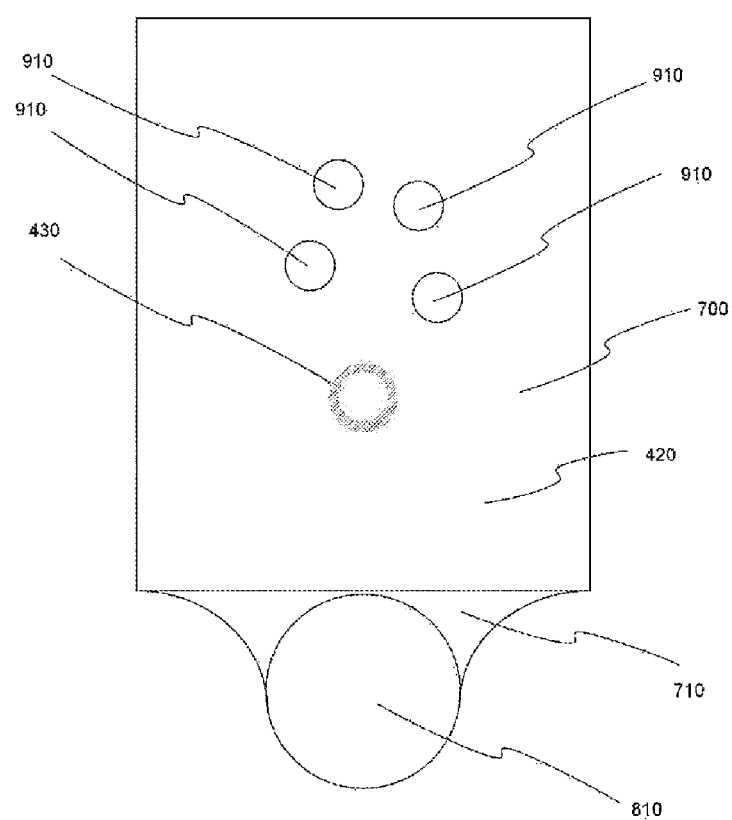
FIG. 18 is a view showing another example of the inspection process in the case where the number of the tablets placed on the inspection base is less than the number of the tablets based on the prescription information.

Although the example in which the entire of the liquid crystal display panel 420 is turned on or blinked in the case where the number of the tablets placed on the inspection base 700 is short with respect to the number of the tablets of the prescription information is described in the above embodiment, the present invention is not limited thereto. FIG. 18 is a view showing another example of the inspection process in the case where the number of the tablets placed on the inspection base 700 is less than the number of the tablets based on the prescription information.

In a case where the number of the tablets placed on the inspection base 700 is short with respect to the number of the tablets of the prescription information, the distinguishing process part 300 can allow the liquid crystal display panel 420 to display a shortage marking 430 whose number corresponds to the number of the shortage tablets as shown in FIG. 18. In this example, the distinguishing process part 300 allows the liquid crystal display panel 420 to display one shortage marking 430 because the tablets are short by one.

Here, if the shortage marking 430 is displayed at the same position as the tablet placed on the inspection base 700, there is a risk that the operator confuses whether the tablets are short or the surplus tablet exists. Thus, the distinguishing process part 300 allows the liquid crystal display panel 420 to display the shortage marking 430 at a position differing from the positions of the tablets placed on the inspection base 700. Although the shortage marking 430 has a circular shape in this embodiment, the shortage marking 430 is not limited thereto and may be another diagram, a character or a symbol.

According to this embodiment, the operator can easily recognize that the tablets are short and how many tablets are short by visually checking the shortage marking 430. As a result, the operator can add a shortage tablet to quickly perform the inspection again.

DESCRIPTION OF REFERENCE SIGNS

100 Photographing part
200 Inspection part
300 Distinguishing process part
400 Optical process part
410 Marking
420 Liquid crystal display panel
430 Shortage marking
500 Illumination
600 Monitor
610 Re-inspection performing button
700 Inspection base
710 Discharging part
800 Barcode reader
810 Vial bottle
900 Tablet
910 Other tablet
920 Specific tablet
1000 Inspection apparatus

What is claimed is:

1. An inspection apparatus, comprising:
a base for placing medicines thereon;
a photographing part which can photograph the medicines placed on the base; and
an inspection part for performing an inspection for the medicines placed on the base based on an image photographed by the photographing part;
wherein the inspection part performs the inspection whether or not the number of the medicines placed on the base matches with prescription information based on the image photographed by the photographing part and information on the number of the medicines based on the prescription information;
further comprising an optical process part arranged on a rear side of the base, and
wherein in a case where the number of the medicines based on the image photographed by the photographing part is larger than the number of the medicines based on the prescription information, a process for making a location of a surplus medicine visually distinguishable is preform by the optical process part.

2. The inspection apparatus as claimed in claim 1,
wherein a process for making a location of a specific medicine visually distinguishable is preform by the optical process part.

3. The inspection apparatus as claimed in claim 2, wherein the optical process part contains a display part, and
wherein the display part displays at least one of a character, a diagram and a symbol for making the location of the specific medicine visually distinguishable.

4. The inspection apparatus as claimed in claim 1, further comprising a distinguishing process part, wherein the distinguishing process part performs a process for identifying a coordinate value of a two-dimensional coordinate system of a specific medicine based on the image photographed by the photographing part and making the specific medicine visually distinguishable from other medicines based on the identified coordinate value.

5. The inspection apparatus as claimed in claim 1, further comprising a distinguishing process part, wherein in a case where each of some of a plurality of medicines of the same kind placed on the base should be a specific medicine as a result of the inspection performed by the inspection part, the distinguishing process part preferentially decides at least one medicine whose distance from an adjacent medicine is long among the plurality of the medicines of the same kind as the specific medicine.

6. The inspection apparatus as claimed in claim 1, wherein the base has a discharging part for discharging a medicine for which the inspection has been performed by the inspection part from the base, and
further comprising a distinguishing process part, wherein in a case where each of some of a plurality of medicines of the same kind placed on the base should be a specific medicine as a result of the inspection performed by the inspection part, the distinguishing process part preferentially decides at least one medicine whose distance from the discharging part is long among the plurality of the medicines of the same kind as the specific medicine.

7. The inspection apparatus as claimed in claim 1,
wherein the inspection part performs the inspection whether or not the number, the kind or a combination of the number and the kind of the medicines placed on the base matches with prescription information based on information on the kind of the medicines based on the prescription information and master images for the medicines.

8. The inspection apparatus as claimed in claim 7, wherein a specific medicine is a medicine differing from the information on the kind or the number of the medicines based on the prescription information as a result of the inspection performed by the inspection part, and
wherein other medicines are medicines matching with the information on the kind and the number of the medicines based on the prescription information as the result of the inspection performed by the inspection part.

9. The inspection apparatus as claimed in claim 7, wherein a specific medicine is a medicine matching with information on the kind and the number of the medicines based on a result of the inspection performed by the inspection part, and
wherein other medicines are medicines differing from the information on the kind and the number of the medicines based on the prescription information as the result of the inspection performed by the inspection part.

10. The inspection apparatus as claimed in claim 1, wherein the inspection part further performs the inspection whether or not the kind of the medicines placed on the base matches with prescription information based on the image photographed by the photographing part and information on the kind of the medicines based on the prescription information; and wherein in a case where the kind of the medicines based on the image photographed by the photographing part is different from the kind of the medicines based on the prescription information, a process for making a location of a surplus medicine visually distinguishable is preform by the optical process part.

11. An inspection apparatus-comprising:

a base for placing medicines thereon;

a photographing part which can photograph the medicines placed on the base; and an inspection part for performing an inspection for the medicines placed on the base based on an image photographed by the photographing part;

wherein the inspection part performs the inspection whether or not the number of the medicines placed on the base matches with prescription information based on the image photographed by the photographing part and information on the number of the medicines based on the prescription information;

further comprising an optical process part arranged on a rear side of the base, and wherein in a case where the number of the medicines based on the image photographed by the photographing part is less than the number of the medicines based on the prescription information, the optical process part optically emit in whole or a process of markings whose number corresponds to the number of shortage tablets is preform by the optical process part.

* * * * *